United States Patent Office 2,974,135
Patented Mar. 7, 1961

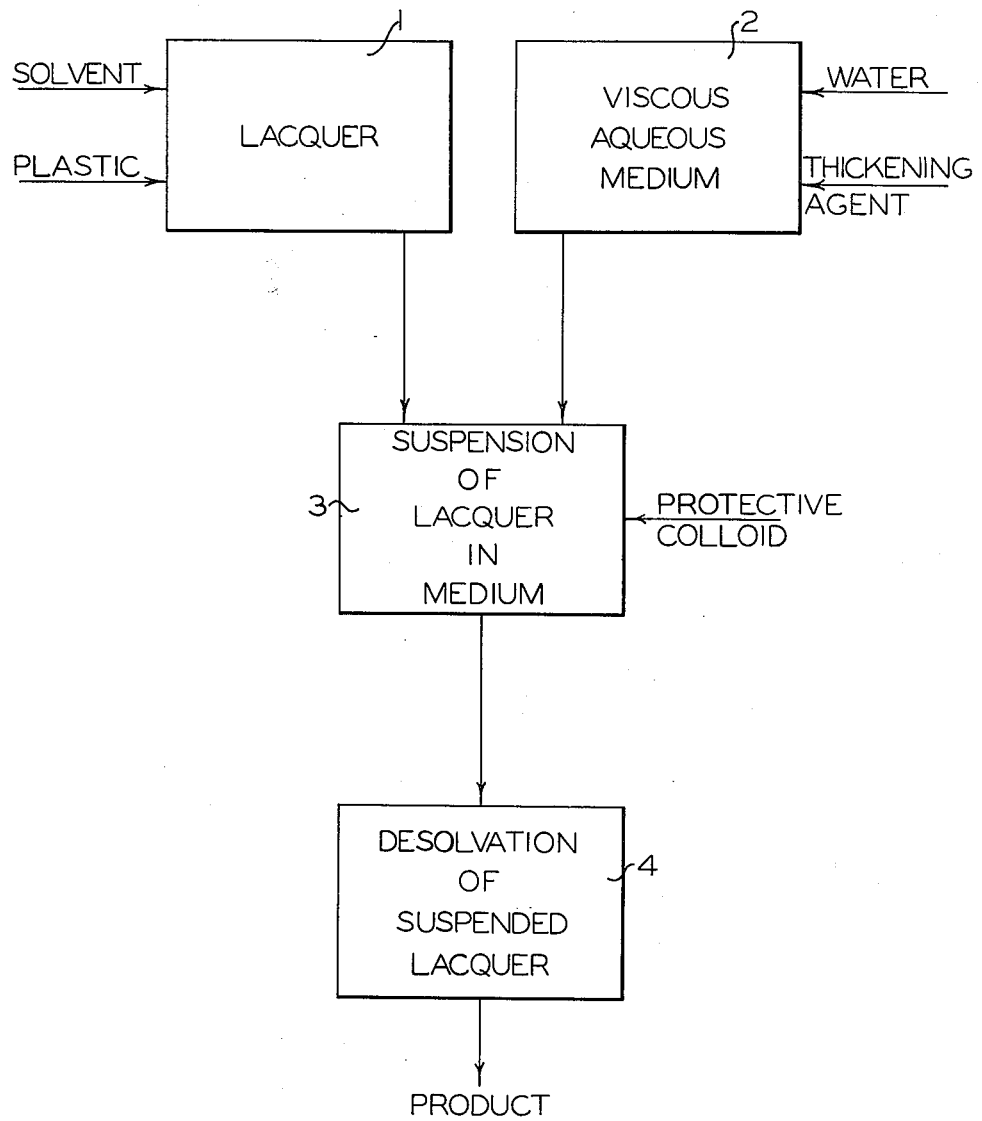

2,974,135

METHOD OF MAKING PLASTIC PELLETS

Eugene A. Andrew, Berkeley, Mo., assignor to Olin Mathieson Chemical Corporation, East Alton, Ill., a corporation of Virginia Filed Mar. 4, 1958, Ser. No. 718,975

6 Claims. (Cl. 260—223)

This invention relates to the treatment of plastics and particularly to the manufacture of relatively large spherical particles of water insoluble organic plastic material.

Various methods for the preparation of spherical and near-spherical particles of organic plastic materials have heretofore been proposed. While such processes are generally quite satisfactory in the manufacture of relatively small spherical particles having an average diameter up to about 0.020 inch, they have been exceedingly disappointing in attempted adaptations to the preparation of particles having minimum average diameters of 0.040 inch. Spherical particles of plastic organic material have traditionally been prepared by suspending a lacquer of the material in water and evaporating the solvent from the suspended lacquer particles. Such a system is typified by the teachings of Olsen, Tibbets and Kerone in U.S. Patent 2,027,114. Processes of this type are necessarily limited to the production of relatively small spheres of plastic material. When attempts were made to obtain relatively large plastic spheres by such methods, it was found that the amount of agitation required to keep the lacquer particles suspended would break down the lacquer particles so as to yield relatively small spherical bodies. On the other hand, when the lacquer was made more concentrated to resist the disintegrating and distorting effect of the agitation, the lacquer was too rigid for spheroidization. Although the desirability of providing a simple process for the manufacture of relatively large plastic spheres for use as molding powders, heat insulation and dielectric applications has long been recognized, such products could not be obtained by the prior art processes.

More recently, the process for the manufacture of spherical particles of plastic material by removal of its solvent after the particles have become rounded while suspended in an aqueous medium, has been materially improved by presizing the particles to be formed before or at their point of introduction into the suspending medium. While this modification does provide for the manufacture of slightly larger spheres or sphere-like bodies, it still has the restriction that was inherent to the original processes. Thus, here again the size of the particles is limited because in the manufacture of large particles, the agitation necessary to keep them in suspension results in their sub-division or distortion.

It is, therefore, an object of this invention to provide a novel process for the preparation of spherical particles of plastic material overcoming the disadvantages of the prior art. Another object of this invention is to provide a novel process for the preparation of relatively large spherical particles of organic plastic material. A more specific object of this invention is to provide an efficient process for obtaining uniformly dimensioned substantially spherical plastic particles having a minimum average diameter in excess of about 0.040 inch.

In accordance with this invention, these and other objects are accomplished, generally speaking, by spheroidizing and removing the solvent from a lacquer of a water insoluble organic plastic material while suspended in a liquid aqueous medium having a relative viscosity of at least about 5 centipoise. More specifically, the invention contemplates the production of spherical or globular particles of a water insoluble organic plastic material having a diameter of at least 0.040 inch by dissolving the plastic material in a solvent to form a lacquer, suspending particles of the lacquer in an aqueous liquid medium having a relative viscosity of at least about 5 centipoise, and removing the solvent from the suspended lacquer particles after they have rounded up.

The viscosity of the aqueous suspending medium must be at least about 5 centipoise to achieve the results of this invention. When the viscosity of the suspending medium is less viscous, the agitation must be increased to such a point that the lacquer globules are broken down so as to form undesirably small particles. The viscosity of the suspending medium can vary widely, depending upon the idiosyncrasies of the particular apparatus used and the specific lacquer being treated. It has been found, however, that suspending media having a relative viscosity in excess of about 100 centipoise detract from the efficiency of the process of this invention. When exceedingly viscous media, having a viscosity of over about 100 centipoise are used, the amount of energy required to agitate the system is inordinate and does not enhance the properties of the product obtained.

After the lacquer bodies suspended in the aqueous liquor have become spherical, they are rendered solid by separating the solvent from them. This can be accomplished by heating the suspension up to or slightly below the boiling point of the solvent and maintaining this elevated temperature until substantially all of the solvent is removed. Alternatively, the solvent can be removed by elutriation, air stripping, or equivalent methods. In any event, the viscosity of the aqueous liquid suspending medium must be above approximately 5 centipoise while the pellets are being shaped and solidified.

The viscosity of the aqueous suspending medium is increased by the addition of a thickening agent. Suitable materials of this type include guar gum, the polyacrylamides, the high molecular weight water insoluble polymers of ethylene glycol, carboxymethyl cellulose, and similar materials whose water suspensions or solutions have a viscosity considerably greater than that of water. The chemical structure or physical characteristics of the particular thickening agent used is generally immaterial so long as the chemical environment is not appreciably changed. It is only necessary that such materials have a greater affinity for water than for the water immiscible lacquer and that they are effective in increasing the viscosity of water to the required value. The concentration of this material in the water or aqueous medium will vary depending upon the particular material used. In most instances, however, it has been found that solutions or suspensions having a concentration of about 0.5 percent by weight will provide the required viscosity increase; however, in some cases, 1 percent or more may be required.

A protective colloid is also present in the aqueous medium to prevent collision and agglomeration of the suspended lacquer globules. Suitable protective colloids include animal glues, gum arabic, gum tragacanth, starch, bentonite and similar materials.

The lacquer particles which are suspended and spheroidized in the viscous aqueous medium and subsequently solidified by removal of the solvent may be formed by the agitation of a quantity of lacquer in the medium so as to subdivide it into a plurality of lacquer particles of the desired size. Alternatively, presized lacquer particles can be introduced into the aqueous medium. In either case, the forces of agitation are moderate and only sufficient to maintain the suspension, and not of such violence as to subdivide the suspended bodies. When the lacquer particles are formed by breaking down a relatively large volume of the lacquer suspended in the aqueous medium, it has been found advantageous to add the thickening agent to the medium after the lacquer globules have been formed. In this way, an economy of initial agitational force to size the globules is realized while still obtaining the advantages of the invention by spheroidizing and de-solvating the lacquer globules while suspended in a viscous medium.

The process of this invention can be readily utilized for the manufacture of relatively large (i.e., above about 0.040 inch) spherical particles of water insoluble organic plastic materials. Thus, this process can be used in forming such spheres having a base of nitrocellulose, polyvinyl chloride, polyvinyl acetate, polyvinyl chloride-acetate copolymers, polystyrene, cellulose acetate butyrate, ethyl cellulose, and other similar plastic materials.

The solvent utilized in forming the lacquer must be substantially water immiscible and may be a single compound or a mixed solvent. The choice of a particular solvent will be dictated by its activity toward the material being treated and to an extent, by the particular method for solvent removal. In most cases, it has been found more expeditious to remove the solvent by distillation. To accomplish this, the solvent must have a boiling point less than the boiling point of water. When the solvent is removed by elutriation or similar means, less volatile solvents or solvent mixtures can be used.

The invention and the manner in which it is carried out will be clarified by reference to the drawing which is a flow diagram illustrating the procedural steps of the present process. As indicated at 1 a lacquer is prepared by dissolving an organic plastic material in a substantially water immiscible solvent. Also, a viscous aqueous suspending medium indicated at 2 is formed by dissolving or dispersing a thickening agent in water. The amount of thickening agent added is sufficient to increase the viscosity of the suspending medium to at least about 5 centipoise and not greater than 100 centipoise and to maintain this viscosity range at the boiling point of the solvent used in making up the lacquer. The lacquer and the aqueous medium are mixed together to form an aqueous suspension of the lacquer as shown diagrammatically at 3. A protective colloid can be added at this point or, if preferred, can be added either to the lacquer or the aqueous medium prior to mixing. The suspension is maintained by agitation. After the suspended lacquer particles have assumed a spherical shape, they are desolvated as indicated at 4 to yield substantially spherical solid particles which can be removed from the suspension by any conventional means.

The invention will be more fully understood by reference to the following specific example of a preferred embodiment thereof. In this embodiment, unless otherwise indicated, all proportions are expressed in parts by weight.

In accordance with this preferred embodiment, large diameter, substantially spherical nitrocellulose propellent powder grains were prepared. Approximately 80 parts of fibrous nitrocellulose wet with about 40 parts of water were dissolved in about 180 parts of ethyl acetate to provide approximately 300 parts of a heavy nitrocellulose lacquer. The lacquer also contained about 1% diphenylamine based on the dry weight of nitrocellulose and about 0.25% of chalk, also on the dry nitrocellulose basis. This heavy lacquer was extruded through an orifice of 0.056 inch in diameter and sliced in a moving suspending liquid medium into lengths approximating the diameter. This aqueous medium, which was maintained at a temperature of about 60° C. contained about 750 parts water in which were dissolved or suspended about 2 parts of guar gum to increase the viscosity of the water to about 15 centipoise. The solution also contained about 14 parts of animal glue as a protective colloid and about 27 parts of sodium sulfate. In addition, the aqueous medium was prefortified with approximately 15 parts of ethyl acetate to minimize any migration of the solvent from the lacquer into the aqueous medium.

When the extruded lacquer contains water, as indicated above, the lacquer bodies must be subjected to the mild agitation of the water bath for a period of about 3 or 4 hours to insure their rounding. When the extruded lacquer is substantially anhydrous, however, the rounding of the cylinders in the bath takes place practically instantaneously. In either event, after the suspension has been maintained for such a time that the bodies of lacquer are sufficiently rounded, the bath and contents are gradually heated to about 99° C. The solvent is thus sufficiently eliminated and hardened suspended spherical bodies are obtained. The resultant powder grains were practically spherical and about 80% of them were between 0.050 and 0.060 inch in diameter. This type of powder which cannot be produced by conventional methods was particularly well suited for use in larger caliber ammunition.

It will be noted that in the above preferred embodiment, the aqueous suspending medium was prefortified with the solvent used to prepare the lacquer. While this is not essential to the present invention, it is preferable in all cases where there may be any tendency for the solvent to migrate from the suspended lacquer bodies into the aqueous medium. This prefortification tends to prevent surface hardening of the lacquer bodies before they have become spheroidized.

While in the above specific example, the solvent-to-nitrocellulose ratio was approximately 2.25:1 and the ratio of the liquor-to-lacquer was approximately 2.5:1, it will be appreciated by those skilled in the art that such proportions are not critical and can be modified extensively dependent upon the particular components entering the system and upon the type of apparatus used.

From the foregoing description, those skilled in the art should understand that the invention accomplishes its objects and provides a novel process whereby relatively large spherical bodies of organic plasticizable material may be made with facility and on a large scale and also within a narrow size range. While a complete embodiment has been disclosed in detail and modifications therein suggested, it is to be understood that the example given is for the purpose of illustrating the invention, and not by way of limitation. It is recognized that those skilled in the art will make appropriate adjustment of the several variables in the process in order to adapt it to the peculiarities of any given operation, and consequently it is to be distinctly understood that the invention is not limited to the examples given, save as indicated in the appended claims.

Having thus described the invention, what is claimed and desired to be secured by Letters Patent is:

1. A process for the manufacture of substantially spherical particles of water insoluble organic material having a minimum diameter of about 0.04 inch comprising dissolving the organic material in a substantially water-immiscible solvent to form a lacquer, suspending bodies of the lacquer in an agitated aqueous liquid medium having a relative viscosity between about 5 and about 100 centipoise in the presence of a protective colloid, maintaining the suspension by agitation until the bodies become substantially spherical, removing the solvent from the suspended lacquer bodies while maintaining the viscosity of the liquid medium between about 5 and about 100 centipoise, and separating the particles from the suspending medium.

2. A process for the manufacture of substantially spherical particles of water insoluble organic material having a minimum diameter of about 0.04 inch comprising dissolving the organic material in a substantially water-immiscible solvent having a boiling point less than the boiling point of water to form a lacquer, suspending bodies of the lacquer in an agitated aqueous liquid medium in the presence of a protective colloid, said liquid medium having a relative viscosity between about 5 and 100 centipoise at a temperature approximating the boiling point of the water-immiscible solvent, maintaining the suspension by agitation until the bodies become substantially spherical, removing the solvent from the suspended lacquer bodies by distillation while maintaining the viscosity of the liquid medium between about 5 and about 100 centipoise, and separating the resultant particles from the suspending medium.

3. A process for the manufacture of substantially spherical particles of water insoluble organic material having a minimum diameter of about 0.04 inch comprising suspending the organic material and its substantially water-immiscible solvent in an agitated aqueous liquid medium having a relative viscosity between about 5 and 100 centipoise in the presence of a protective colloid, and removing the solvent while maintaining the viscosity of the liquid medium between about 5 and about 100 centipoise.

4. A process for the manufacture of substantially spherical particles of water insoluble organic material having a minimum diameter of about 0.04 inch comprising suspending the organic material and its substantially water-immiscible solvent in an agitated aqueous medium, maintaining the suspension by agitation until the organic material is dissolved in the solvent to form a lacquer, stopping the agitation and permitting the lacquer to coalesce, adding a protective colloid and a thickening agent to the aqueous medium that will increase its viscosity to at least about 5 centipoise and less than about 100 centipoise, agitating the system so as to form globules of lacquer suspended in the aqueous medium, maintaining the suspension until the suspended globules become spherical, removing the solvent from the suspended spherical grains while maintaining the viscosity of the liquid medium between about 5 and about 100 centipoise, and separating the resultant spherical particles from the aqueous medium.

5. A process for the preparation of substantially spherical particles of water insoluble organic material having a minimum diameter of about 0.04 inch comprising spheroidizing and de-solvating bodies of a water-immiscible lacquer in the presence of a protective colloid while suspended in an agitated liquid aqueous medium having a relative viscosity between about 5 and 100 centipoise, and separating the particles from the suspending medium.

6. The process of claim 5 in which the water insoluble organic material is nitrocellulose.

References Cited in the file of this patent

UNITED STATES PATENTS

| | | |
|---|---|---|
| 2,027,114 | Olsen et al. | Jan. 7, 1936 |
| 2,160,626 | Schaefer | May 30, 1939 |
| 2,176,879 | Bartell | Oct. 24, 1939 |
| 2,375,175 | Silk | May 1, 1945 |
| 2,566,567 | Hutchinson et al. | Sept. 4, 1951 |
| 2,740,705 | O'Neill et al. | Apr. 3, 1956 |